United States Patent [19]
Thayer et al.

[11] Patent Number: 5,531,377
[45] Date of Patent: Jul. 2, 1996

[54] METHOD AND APPARATUS FOR CALIBRATION OF COMFORT CONTROL IR SENSOR

[75] Inventors: Peter A. Thayer, Indianapolis; Morgan D. Murphy, Kokomo, both of Ind.

[73] Assignee: Delco Electronics Corporation, Kokomo, Ind.

[21] Appl. No.: 382,107

[22] Filed: Feb. 1, 1995

[51] Int. Cl.⁶ .............................. G01J 5/00; G05D 23/00
[52] U.S. Cl. .................. 236/49.3; 374/128; 236/91 C
[58] Field of Search .............................. 236/91 C, 49.3, 236/68.8; 374/128, 121

[56] References Cited

U.S. PATENT DOCUMENTS

| | | | |
|---|---|---|---|
| 2,562,538 | 7/1951 | Dyer | 374/132 |
| 2,835,779 | 5/1985 | Kazan | 236/68 B |
| 4,920,759 | 5/1990 | Tanaka et al. | 62/244 |
| 5,105,366 | 4/1992 | Beckey | 364/505 |
| 5,114,242 | 5/1992 | Gat et al. | 374/128 |
| 5,148,977 | 9/1992 | Hibino et al. | 236/49.3 |
| 5,150,969 | 9/1992 | Goldberg et al. | 374/128 |
| 5,187,943 | 2/1993 | Taniguchi et al. | 62/180 |
| 5,333,784 | 8/1994 | Pompei | 374/121 X |

FOREIGN PATENT DOCUMENTS 61-195229  8/1986  Japan ...................................... 374/132

OTHER PUBLICATIONS

U.S. patent application Ser. No. 08/158,555; Freiberger Nov. 1993.

*Primary Examiner*—William E. Wayner
*Attorney, Agent, or Firm*—Jimmy L. Funke

[57] ABSTRACT

An infrared sensor for determining the temperature of a car interior includes a thermistor and a thermopile in a can and a protective window which exposes the thermopile to the thermal energy of the car interior. The combined outputs of these thermally sensitive elements represents the interior radiant temperature. The effectiveness of the thermopile changes if the window gets dirty to change its output. A resistive heater on the can is used to heat the sensor during calibration. A microprocessor receiving the outputs of the sensor has an algorithm for adjusting a gain which compensates for sensor changes. When the interior temperature is stable, the sensor is heated and thermistor values before and after heating the sensor are used as a basis for adjustment of the gain.

11 Claims, 3 Drawing Sheets

METHOD AND APPARATUS FOR CALIBRATION OF COMFORT CONTROL IR SENSOR

FIELD OF THE INVENTION

This invention relates to heating, ventilating and air conditioning (HVAC) systems for motor vehicles utilizing infra-red sensing and particularly to apparatus and a method for calibrating infrared sensing apparatus.

BACKGROUND OF THE INVENTION

It is common practice in automotive climate control to determine the thermal comfort level of a passenger compartment by drawing a stream of air from the compartment across a sensor to measure the air temperature and to estimate the effect of sun load on the occupants by a solar sensor mounted on top of the instrument panel for exposure to the sun. These measurements are combined with measurements of outside air temperature and engine coolant temperature and an operator selected comfort setting to supply a control algorithm with the data needed to determine the optimum settings for HVAC mode, blower speed, and mix door settings which together determine outlet air temperature and air speed needed to achieve the comfort setting.

It has been proposed to replace solar sensing or both solar sensing and inside air temperature measurement with infrared (IR) sensing which directly detects the temperature of the occupant seating area and the occupants themselves. Thus irradiation from seat surfaces, occupant skin and occupant clothing, as well as any object in view of an IR sensor becomes a prime control parameter. The IR sensor includes a thermopile in a protective envelope having a window for viewing the desired portion of the vehicle interior, so that the thermopile can sense the temperature of the viewed region. The IR sensor is subject to change in efficiency due to accumulation of dirt or other matter on the window, so that its output or the weight given to the output should be adjusted to compensate for such changes.

SUMMARY OF THE INVENTION

It is therefore an object of the invention to calibrate the IR sensor of an HVAC system. Another object is to periodically compensate for changes in an IR sensor.

The climate control of an HVAC system uses a microcomputer to receive inputs from sensors and to control the system mode, blower speed and mixer door positions, thereby regulating the air output to the passenger compartment. The sensors comprise an IR sensor and thermistor combination, an internal air temperature sensor, an outside air temperature sensor, an engine coolant sensor, and various other sensors. The coolant sensor only affects the mix door position since the coolant temperature determines the availability of hot air to the system.

The IR sensor monitors the radiation level of the front seat and its occupants and includes a thermopile having a sensing junction affected by the radiation level of the scene and a reference junction. The reference junction may be warmer or cooler or the same as the sensing junction, and the thermopile output voltage is dependent on the difference in junction temperatures. A thermistor packaged with the thermopile is responsive to the reference junction temperature. A sensor circuit combines the thermistor and the thermopile outputs to generate a voltage which in effect is the combined outputs of those sensors. The output voltage represents the absolute radiant temperature of the scene and is linear at least in the target temperature range of the climate control.

The internal air sensor is an aspirated thermistor; i.e., a stream of the vehicle compartment air flows across the thermistor so that its output voltage represents the internal air temperature. Conventionally, the air flow is produced by a suction arrangement attached to the ventilation blower assembly, but instead it can be produced by a separate motor driven fan.

In the microcomputer an algorithm combines the selected comfort setting, the thermal sensor circuit output information, the internal air temperature information, and outside temperature information to select the HVAC mode (heating, cooling or ventilation) and the blower speed, and further includes engine coolant temperature to select mixer door positions. This combination of information yields an improved comfort level by responding to air temperature and sun load on the vehicle interior or passenger to achieve the selected comfort setting without overreacting to any sensor output. The HVAC system must not widely oscillate around the comfort point.

The thermistor output voltage from the thermal sensor is separately fed to the microprocessor along with the combined output voltage. Alternatively, the thermistor and thermopile outputs are each fed separately to the microprocessor and are combined only by the algorithms programmed therein. In either case the algorithm for controlling the HVAC applies a gain to the thermopile portion of the temperature measurement; the gain is thus set in software and is adjustable for calibration purposes.

For calibration, the IR sensor envelope is equipped with a heater for changing the thermopile reference temperature. One algorithm periodically calibrates the IR sensor by first determining that the vehicle interior is thermally stable such that the IR sensor envelope is at the same thermal level as the interior radiation level whereby the thermopile has no voltage output, then heating the IR sensor envelope and calculating a gain which yields the same temperature measurement before and after heating. To calculate the gain, the temperature change due to heating is determined from the change of thermistor output, and a gain is selected which offsets that change with the change in thermopile output. The heat is applied long enough to avoid errors in transients which are inherent in IR devices.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
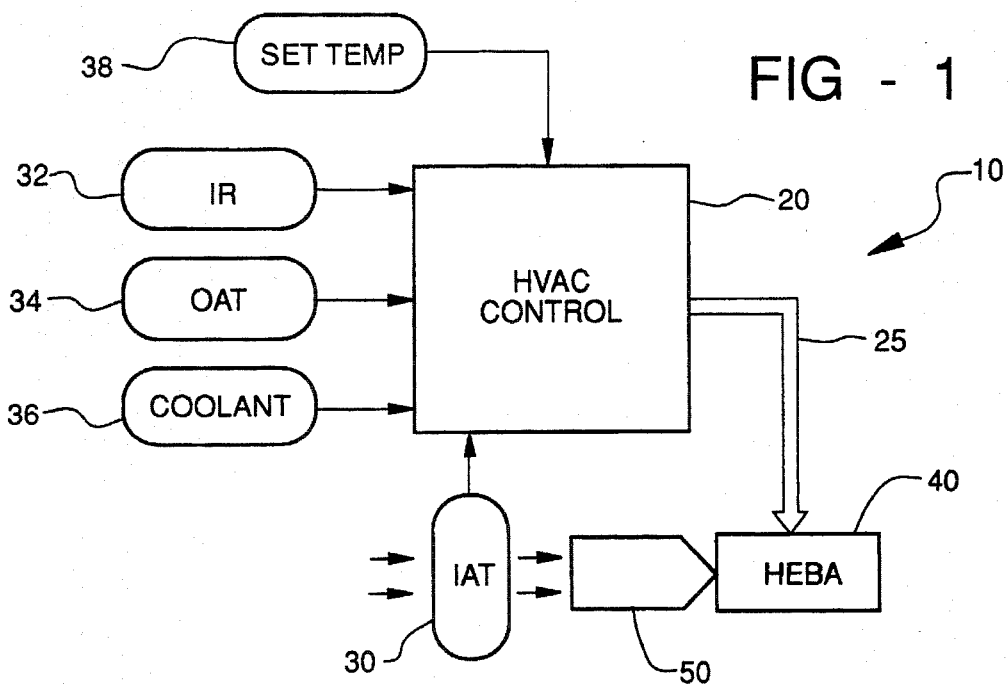
FIG. 1 is a diagram of a calibratible climate control system according to the invention.

Referring first to FIG. 1, a vehicle climate control 10 is shown comprising a heating, ventilation and air conditioning (HVAC) control 20 comprising a conventionally known microcomputer (not illustrated) having a central processing unit, ROM, RAM, I/O ports and A/D converters which receive various analog input signals from discrete sensors 30–36 and digitize the same for use in automated control of passenger compartment thermal level. Interior air temperature (IAT) sensor 30 and infrared (IR) sensor 32 provide the primary inputs to HVAC control 20 with outside air temperature (OAT) sensor 34 providing further data to HVAC control 20 for climate control. OAT sensor 34 provides in conjunction with IAT sensor 30 a differential measurement between the passenger compartment and the exterior environment which effects the rate of heat transfer therebetween, while the IR sensor 32 provides a measure of the radiation from the vehicle interior and occupants which provides radiant heat resulting from sun load, occupant's skin and clothing and other sources within the passenger compartment. Coolant temperature (COOLANT) sensor 36 provides a signal to HVAC control 20 which is indicative of the heat capacity of the heater core. Another input to the control includes an operator selected temperature setting signal (SET TEMP) 38 corresponding to the desired thermal level. The various inputs are monitored and processed for controlling temperature maintenance functions of the heater, evaporator and blower assembly (HEBA) 40 which, as the name suggests, includes; a heater core for circulating engine coolant for warming air, an evaporator core for circulating refrigerant for cooling air, a blower or fan for circulating air through the heater and evaporator cores in proportion to the position of an air mix door as determined by solenoid operated vacuum switches or electrical motors responsive to the HVAC controller outputs 25. The position of the air mix door determines the temperature of the air circulated by HEBA 40. The HEBA often times further includes control of exiting air to passenger determined modes such as lower, upper, bi-level, defog and defrost and entering air between fresh and recirculated modes. Solenoid controlled vacuum switches responsive to HVAC outputs 25 are the most prevalent actuators used for motive control of air delivery doors effective to establish the modes as described above. Electrical motor control of air delivery doors is also practiced in the art and is equally applicable to the present invention.

FIG. 1 further illustrates the means by which passenger compartment air temperature is measured. In addition to IAT sensor 30 which is normally positioned behind the instrument panel (not illustrated), aspirator tube 50 (functionally illustrated) is utilized to draw passenger compartment air in the vicinity of the front of the instrument panel across IAT sensor 30 for example by connecting the remote end of the tube to a high air flow portion of HEBA 40 through a venturi arrangement to generate a small air flow. A measure of the interior air temperature is thereby obtained.

Figure 2:
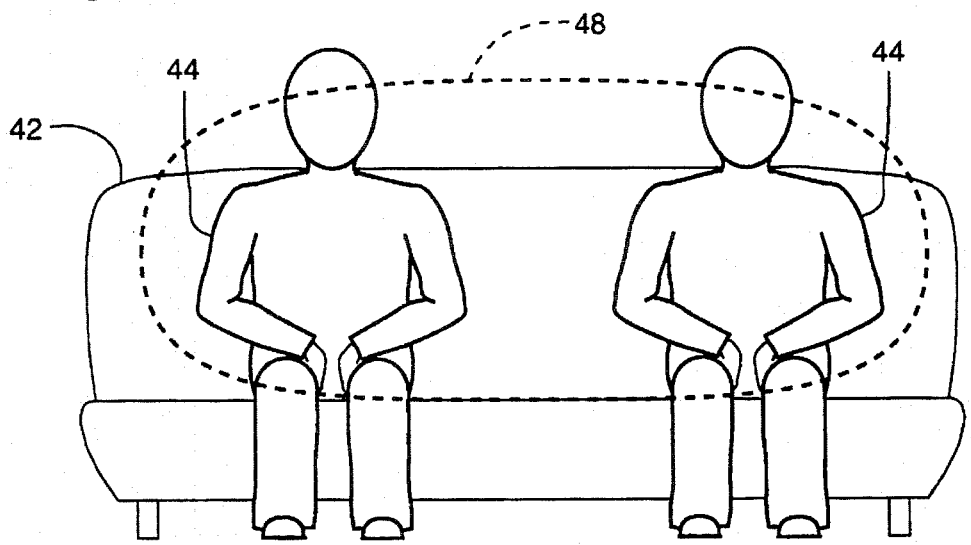
FIG. 2 is a view of a vehicle seat showing the field of view of an IR sensor for the system of FIG. 1.

Turning to FIG. 2, a vehicle seat is designated by the numeral 42 and an occupant by the numeral 44. An infra-red (IR) sensor assembly 32 is positioned within the passenger compartment of the vehicle such that the viewing field, indicated by the ellipse 48 is representative of predetermined portions of the seat 42 and occupants 44. Appropriate locations for the IR sensor assembly 32 include the vehicle instrument panel such that the viewing field is rear facing with respect thereto. This way, a good portion of the passenger compartment is within the viewing field of the sensor.

The viewing angle of an IR sensor is determined by design of the sensor and, if inadequate for the desired viewing field, may be modified by lensing. A particularly attractive option for widening the viewing angle and minimizing dimensional penalty is to use a fresnel lens comprised of low loss material such as polyethylene.

Response of the sensor to different wavelengths of electromagnetic radiation can be controlled by the window material. Most of the energy of concern is in the ten micron wavelength range and an electromagnetic radiation sensor designed with windows providing admissibility in that range has been shown to perform adequately for providing a measure of passenger compartment thermal level. Silicon window material has been shown to provide approximately 60 percent admissibility in this range, with polyethylene window material improving this figure to approximately 90 percent. The various window materials therefore provide the means by which selective wavelengths of thermal energy are filtered for inclusion or exclusion depending upon the desired measurement.

Figure 3:
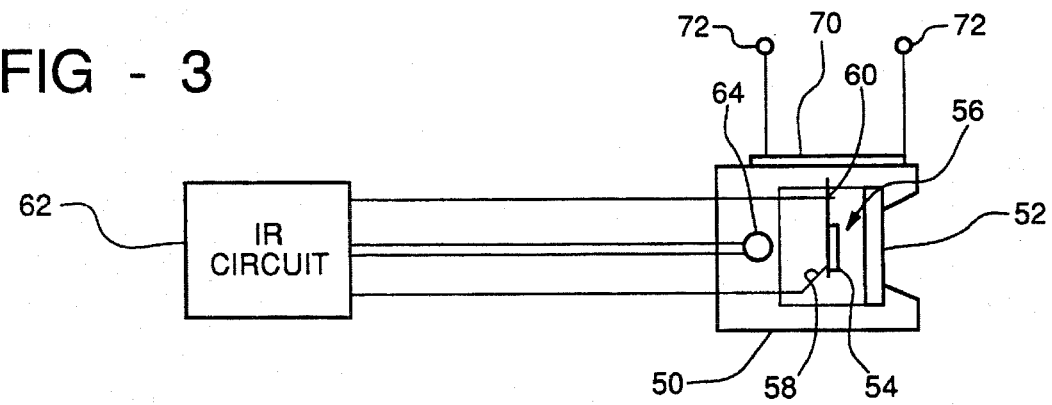
FIG. 3 is a schematic diagram of an IR sensor assembly for the system of FIG. 1.

FIG. 3 depicts an IR sensor assembly 32 which comprises a can 50 having a window 52 and a target region 54. Radiation is transmitted through the window 52 between the target region 54 and the viewing field 48 such that the radiant level of the target region approaches or equals that of the viewing field. A thermopile 56 has a sensing junction 58 at the target 54 and a reference junction 60 thermally coupled to the wall of the can 50. The thermopile 56 leads extend to an IR circuit 62. A thermistor 64 on the can senses the temperature of the reference junction and has leads extending to the circuit 62. A heater in the form of a resistor 70 on the outer can surface is connected to leads 72. The heater is effective to quickly heat the IR assembly during calibration. An application of 1 watt of power for 30 seconds would raise the temperature by about 10 degrees F. Power is applied in pulses to slowly heat the sensor body without creating sensor discontinuities caused by large temperature gradients.

Figure 4:
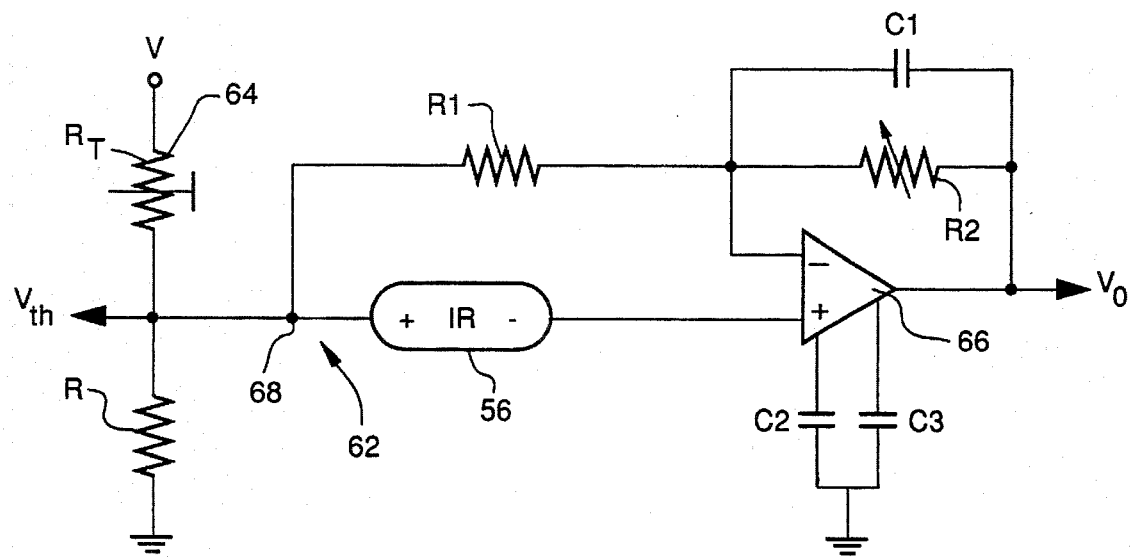
FIG. 4 is a circuit diagram for the sensor assembly of FIG. 3.

In the present embodiment, an IR sensor part number PL-82 available from Armtec/Ragen Incorporated, 10 Ammon Drive, Manchester, N.H. is utilized. This sensor is a twenty junction thermocouple device with a silicon window 52 and produces a voltage output on the order of 45 microvolts per degree fahrenheit. It is apparent that a change in passenger compartment thermal level of several degrees therefore will only result in voltage changes on the order of tens or perhaps hundreds of microvolts, which small signals pose unique amplification challenges. A cost effective and widely available means for signal amplification meeting the needs of this embodiment is a chopper stabilized amplifier in differential mode which is innately characterized by extremely low input offset voltage thereby being responsive to the small voltage changes provided by the IR sensor chosen. An exemplary circuit 62 is set forth in FIG. 4 for accomplishing a chopper stabilized amplification of the IR sensor signal wherein chopper stabilized amplifier 66 is designated a TL2654 available from Texas Instruments, Dallas, Tex. Exemplary component values are shown but are subject to modification according to required operation. The present embodiment is configured for non-inverting operation having the non-inverting terminal connected to the negative terminal of the IR sensor. The positive terminal of the thermopile 56 is coupled to one end of a resistor R1 to establish offset node 68, the other end thereof coupled to the inverting input of the amplifier. The output of the amplifier is coupled through resistor R2 to the inverting input in feedback to establish the gain (G) of the circuit in accordance with a ratiometric relationship between R2 and R1 $[G=(R1+R2)/R1]$. Integrating capacitor C1 is preferably coupled across the inverting terminal and the output in order to stabilize the output signal. Each of the capacitors C2, C3 shown coupled to ground provides storage of a potential for nulling the amplifier offset voltage during a respective one of amplifying or nulling phases of the chopper amplifier's operation. The output of amplifier 66 comprises a conditioned IR sensor signal for input into an HVAC control. An offset voltage substantially equal to one-half the operating voltage V of the amplifier is provided at offset node 68 established between thermopile 56 positive terminal and resistor R1 to allow operation through the entire operating voltage range. Output voltage is therefore represented by the equation:

$$Vo = Vth + G*Vir,$$

where Vo is the output voltage, Vth is the offset voltage or thermistor circuit output voltage, G is the gain and Vir is the IR sensor voltage.

As with any thermopile device, the voltage produced between two output terminals thereof is a function of the temperature differential between a set of measuring junctions and reference junctions; and, in the present embodiment, the chosen IR sensor produces a voltage signal substantially proportional to the difference in temperature. In the present embodiment using the above exemplary IR sensor, the measuring junctions are exposed through a silicon window to the passenger compartment infra-red radiation content, and the reference junctions are shielded therefrom so as to remain immune to thermal influences attributed thereto. The reference junction temperature will naturally tend toward a temperature in accordance with thermal influences apart from the infra-red radiation content of the passenger compartment from which they are shielded. These influences include convection from passenger compartment and instrument panel air and conduction from mounting means for the IR sensor and resistive heating of the junctions due to current flow therethrough. The sensor output will: 1) approach zero in the case where the reference junctions tend toward the passenger compartment thermal level as "seen" by the measuring junctions, or; 2) approach an offset in the case where the reference junctions tend toward some dominant local thermal influence such as a proximate incandescent light source.

The present embodiment therefore provides a compensation to the offset voltage applied at the offset node by using the thermistor 64 having variable resistance RT connected in series with a resistor R between a supply voltage V and ground, the junction being connected to the node 68 to supply the offset or thermistor circuit output voltage Vth. The thermistor measures the temperature at the reference junctions, its negative coefficient of resistance causing adjustment to offset voltage Vth in proportion to the temperature change at the reference junction to null the effects of varying reference junction temperature from whatever influence. Therefore, the gain G as determined by the resistor pair R2 and R1 is chosen to produce this desired relationship whereby each unit of temperature change at the reference junctions produces a change to the term Vth which is balanced by the change in the term Vir multiplied by the gain G.

The gain G fixed by hardware is a good approximation of the necessary multiplier to correctly scale the change of 1C of the target to a constant voltage gain on Vo across similar IR circuits; it can not, however, accommodate changes in the IR sensor performance which can occur due to contamination of the sensor window, for example. The microprocessor then includes a software gain adjustment A which is calibrated initially and then periodically during the life of the vehicle. This gain A then takes into account the present condition of the IR sensor to yield a constant gain in Vo' per degree change in the target. Thus the term Vir is multiplied in hardware by the gain G and in software by the additional gain A, so the temperature will be represented by Vo'=Vth+ Vir*G*A.

The calibration of the gain A occurs when the interior radiant temperature of the vehicle is stable and the thermopile junctions are at the same temperature so that the thermistor circuit is the only contributor to the combined output signal. This condition is tested by verifying that the output Vo is equal to the offset voltage. For the example given here, the calibration occurs when the vehicle has been idle for some time to achieve stability, but if desired, it can be performed during operation when the interior radiant temperature has become stable. For the purpose of calibration it is assumed that the thermistor circuit output Vth accurately represents the interior radiant temperature during the stable condition when the IR sensor has no output. Then the sensor assembly is quickly heated and, since the net output Vo' should not change, the new gain is calculated as that necessary to offset the change in thermistor output.

Figure 5:
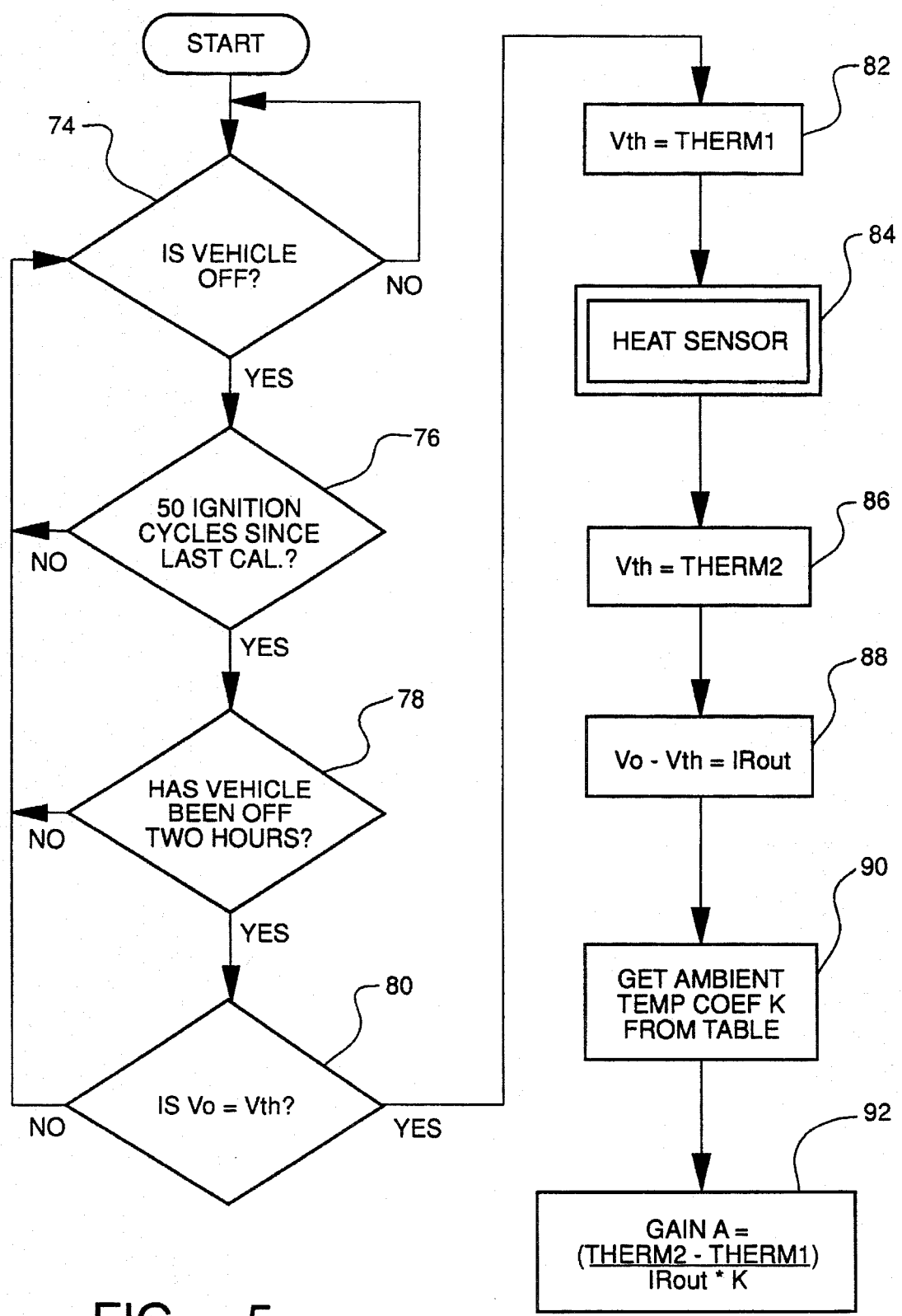
FIG. 5 is a flow chart illustrating a program for calibrating the IR sensor according to the invention.

The flow chart of FIG. 5 illustrates the method of gain calibration. The flow chart generally represents a microprocessor algorithm, along with the step of heating the IR sensor assembly. This description contains numerals in brackets <n> which refer to the functions of the blocks bearing the corresponding reference numerals. It is first determined whether the vehicle ignition is off <74> and if so whether 50 ignition cycles have occurred since the last calibration <76>. This allows for occasional calibration. Then if the vehicle has been off for two hours <78>, the combined output Vo is compared with the offset voltage or thermistor output Vth <80>. If they are equal, the temperature is stable and the calibration proceeds. Before heating the thermistor output Vth is stored as a value THERM1 <82> and then the sensor is heated <84> by applying current pulses to the heater for several seconds. After heating, the new thermistor output Vth is store as THERM2 <86> and the voltage difference Vo–Vth is stored as value IRout <88>. When the vehicle is not operating the sensor temperature may reach a range where the response of the thermopile and the thermistor are no longer linear. To correct for such thermal effect an empirically derived table of temperature coefficients is prepared and stored in the microprocessor, and is addressed according to the value THERM1 to retrieve a coefficient K <90>. (If the calibration is carried out while the vehicle is operating and the temperature is in the linear range of the sensors, the coefficient table is unnecessary.) Finally, the new gain A is calculated on the basis of the measured change of temperature of the sensor and the value of IRout <92>, i.e.

$$A = (THERM2 - THERM1)/IRout*K.$$

The interior radiant temperature can then be calculated as (Vo–Vth)*A+Vth.

Figure 6:
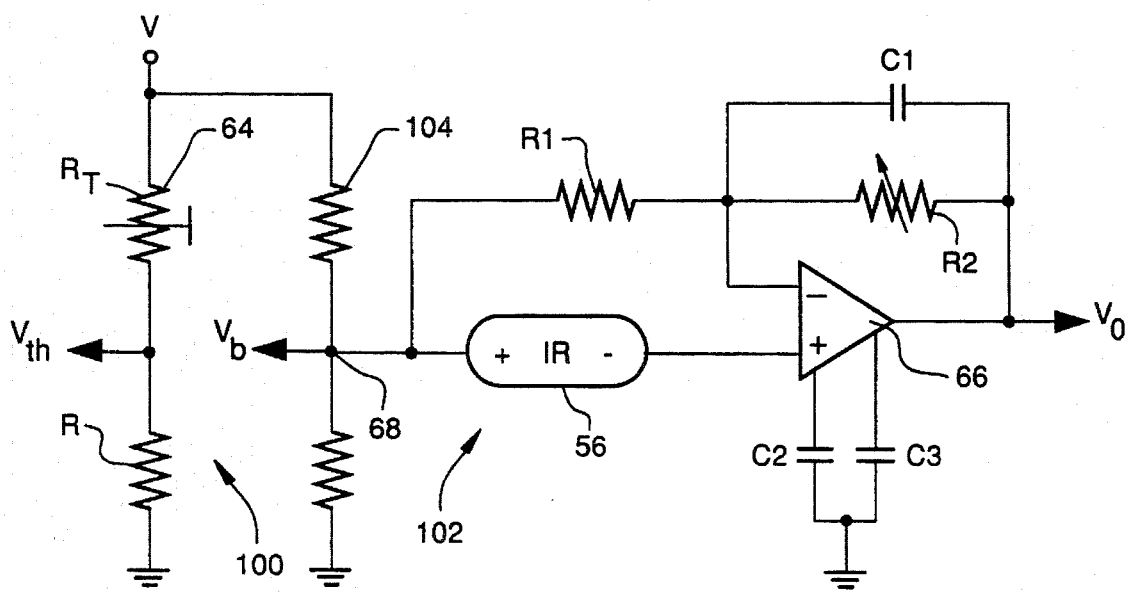
FIG. 6 is a diagram of a second embodiment of the circuit for the sensor assembly of FIG. 3.

Another embodiment of the IR sensor circuit is shown in FIG. 6. There, the thermistor circuit 100 is separate from the IR sensor circuit 102 to provide the output Vth. A fixed bias voltage Vb established by a voltage divider 104 is used at the input of the IR sensor circuit so that the output Vo is the amplified IR voltage G*Vir plus the bias and is independent of the thermistor voltage. The calibration method using this embodiment is similar as that set forth in FIG. 5. The differences are 1) the block 80 function would be "Is Vo=Vb?" and 2) the block 88 function would be Vo−Vb= IRout.

It will thus be apparent that the IR sensor gain is readily recalibrated periodically to offset any deterioration of the IR sensing capability such as obfuscation of the window due to spillage or the accretion of surface contaminants. In addition, any change in efficiency of the thermopile would also be compensated.

The embodiments of the invention in which an exclusive property or privilege is claimed are defined as follows:

1. In a comfort control system having a thermal sensor including an IR sensor having an output responsive to interior vehicle radiant temperatures relative to the thermal sensor temperature and a thermistor circuit having an output responsive to the temperature of the thermal sensor, and a microprocessor based control receiving outputs of the IR sensor and the thermistor circuit to determine a value proportionate to the interior vehicle radiant temperature as the sum of the thermistor circuit output and a gain times the IR sensor output, the method of compensating for errors in the IR sensor signal comprising the steps of:

stabilizing the interior vehicle temperature;

detecting the sensor output values;

then heating the temperature sensor;

then again detecting the sensor output values; and compensating for any error by adjusting the value of the gain in the microprocessor based control.

2. The invention as defined in claim 1 wherein the step of stabilizing the interior vehicle temperature includes:

waiting for the thermal sensor temperature to reach the interior radiant temperature; and verifying the stabilization by determining that the IR sensor output does not include a temperature component.

3. The invention as defined in claim 1 wherein the IR sensor has an input bias level, and wherein the step of stabilizing the interior vehicle temperature includes:

waiting for the thermal sensor temperature to reach the interior radiant temperature; and verifying the stabilization by determining that the IR sensor output is equal to the input bias level.

4. The invention as defined in claim 1 wherein the IR sensor output and the thermistor circuit output are combined in a temperature signal and a separate thermistor circuit output is available, and wherein the step of compensating for error comprises the steps of:

calculating the IR sensor output after heating by subtracting the thermistor circuit output from the temperature signal;

determining the temperature change due to heating from thermistor circuit outputs before and after the heating step; and calculating a compensated gain from the temperature change divided by the IR sensor output after heating.

5. The invention as defined in claim 1 wherein the IR sensor output and the thermistor circuit output are combined in a temperature signal Vo and a separate thermistor circuit output having a value Vth is available, and wherein the step of compensating for error comprises the steps of:

calculating the IR sensor output IRout after heating by the function IRout=Vo−Vth where Vo and Vth are values determined after heating;

determining the temperature change due to heating by the function THERM2−THERM1, where THERM1 and THERM2 respectively are values of Vth before and after heating; and calculating a compensated gain A from the temperature change divided by a function of the IR sensor output after heating or A=(THERM2−THERM1)/IRout*K, where K is a temperature coefficient.

6. The invention as defined in claim 5 wherein the temperature coefficient K is a function of temperature sensor response at the temperature before heating.

7. The invention as defined in claim 5 wherein the interior radiant temperature is represented by (Vo−Vth)*A+Vth.

8. The invention as defined in claim 1 wherein the IR sensor output Vo after heating is a thermal value IRout plus a constant Vb, and wherein the step of compensating for error comprises the steps of:

calculating the IR sensor output IRout after heating;

determining the temperature change due to heating by the function THERM2−THERM1, where THERM1 and THERM2 are thermistor circuit output values before and after heating; and calculating a compensated gain A from the temperature change divided by a function of the IR sensor output after heating or A=(THERM2−THERM1)/IRout*K, where K is a temperature coefficient.

9. The invention as defined in claim 8 wherein the current interior radiant temperature is (Vo−Vb)*A+Vth, where Vth is the current thermistor circuit output value.

10. A comfort control system for supplying regulated air to the passenger compartment of an automotive vehicle having temperature sensor calibration comprising:

a sensor package including an IR sensor responsive to thermal radiation levels in the compartment relative to the sensor temperature, a thermistor responsive to the temperature of the sensor package, and a heater for heating the package, the IR sensor being subject to change in efficiency;

a controller including a microprocessor coupled to the sensor package for regulating the temperature, mode and air speed of air entering the passenger compartment;

a circuit including the microprocessor combining outputs of the IR sensor and the thermistor to produce a thermal value representing the interior vehicle temperature; and the controller including means for turning on the heater for a given time when the thermopile temperature is equal to the interior radiant temperature, means for storing a calibration value which compensates for IR sensor changes, and means for adjusting the calibration value to neutralize any apparent change of the thermal value upon heating.

11. The invention as defined in claim 10 wherein:

the circuit comprises means for summing the outputs of the IR sensor and the thermopile and for producing a separate thermopile output;

the microprocessor includes means for calculating the IR sensor output; and the means for adjusting the calibration value comprises means for determining the change in thermopile output upon heating, and means for calculating the calibration value from the change in the thermopile output and the IR sensor output after heating.

* * * * *